J. F. CRAVEN.
GREASE CUP.
APPLICATION FILED NOV. 11, 1916.

1,234,636.

Patented July 24, 1917.

WITNESSES
W. T. Holman
Jo. Baily Brown

INVENTOR
James F. Craven
by Fred W. Winter
his attorney.

UNITED STATES PATENT OFFICE.

JAMES F. CRAVEN, OF PITTSBURGH, PENNSYLVANIA.

GREASE-CUP.

1,234,636.  Specification of Letters Patent.  Patented July 24, 1917.

Application filed November 11, 1916. Serial No. 130,907.

*To all whom it may concern:*

Be it known that I, JAMES F. CRAVEN, a resident of Pittsburgh, in the county of Allegheny and State of Pennsylvania, have invented a new and useful Improvement in Grease-Cups, of which the following is a specification.

This invention relates to automatic grease cups to be used for feeding a thick lubricant into machine bearings, etc. Among the objects of the invention, it is intended to provide a receptacle of a simple form and comprising a small number of parts which individually may be manufactured at low cost. It is further intended to provide parts of such form that when manufactured the whole cup may be easily assembled, and when in use readily refilled after the contents have been discharged. A further object is to provide such a cup with means to prevent the disconnection of its parts by the vibration of machines to which the device may be attached. And more particularly it is intended to provide a grease cup with the above characteristics in which a substantially constant pressure will be maintained upon the lubricant during the entire operation of emptying it into the machine bearing, and this is done by means of a specially constructed spring, and a specially constructed coöperating follower, together with a cup of particular form. All of this will be more fully described and explained throughout the specification.

Figure 1:
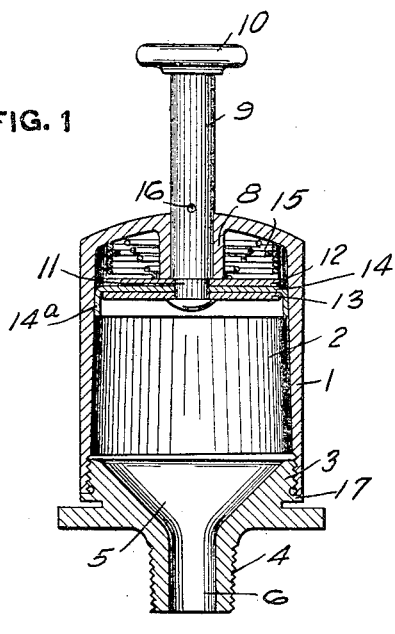
Figure 2:
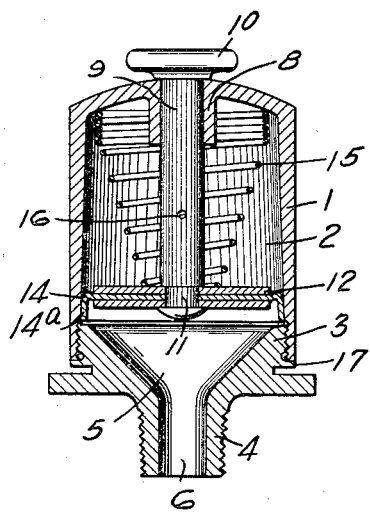
Figure 3:
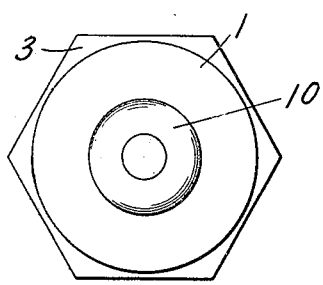
Figure 4:
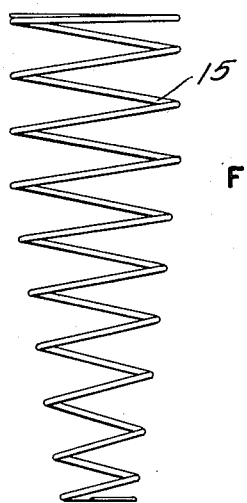

Referring to the drawings, Figure 1 shows a central vertical section through the complete device, the follower being raised as when the cup is filled with grease; Fig. 2 is similar to Fig. 1, except that the follower is lowered, assuming the position resulting from the complete emptying of the receptacle; Fig. 3 is a plan view; and Fig. 4 shows details of a driving spring.

For the lubrication of parts of machines which are in constant use, and especially bearings which from their nature require a semi-solid or pasty form of grease, receptacles for the lubricant have been provided in which the grease is retained in a chamber under a pressure sufficient to force the lubricant into the bearing. Means for applying this pressure have been provided, comprising springs which exert a force on top of the contents of the grease cup. The difficulty encountered in such constructions has been that when the cup was entirely filled with grease the pressure of the spring-operated member thereon has been much greater than when the cup was nearly emptied, due to the weakening of the spring as it nears the limit of complete expansion, as will be obvious. Where the pressure varies materially, there is a variation in the supply of lubricant to the bearing with the disadvantages which must result from such unequal lubrication. Also, if the pressure of the spring is too great it squeezes the oil out of the grease. The present invention provides a means for a substantially constant supply of lubricant, and avoids the difficulties above mentioned.

The grease cup comprises a casing 1, having a central tapered bore 2, which is threaded on the inside at its open end in order to form a union with a base member 3, which has a threaded extension 4, adapted to be screwed into an opening in the part to be lubricated. This base member has a sloping inner surface 5, the walls in cross section being at about 90 degrees to each other, and so forming a conical bottom for the grease cup, and a tapered guide to the central outlet bore 6, which allows the grease to pass out with the least possible friction. The body portion of the base member is shown as hexagonal, so that a wrench may be applied for securely fastening it into a member of the machine to be lubricated. The upper wall of the casing has an inwardly extending projection 8, which has a central bore, forming a close-fitting retaining guide for a stem 9, which passes therethrough. This stem has a terminal knob 10, and a riveted extension 11, adapted to retain two metal disks 12 and 13, between which is clamped a flexible member 14, the two disks and flexible member making a follower extending across the cup, and adapted to exert pressure upon its contents. A coil spring 15 bears against the upper wall of the cup, and against the follower. A horizontal hole 16 bored through the stem 9, is so situated that a pin therethrough will lock the follower in withdrawn position, for filling the cup, for retaining it, and for withholding pressure from the grease when the cup is not in use.

Just below the threaded portion 3 of the base member, a circular flange 16 is provided, adapted to form an abutment and lock for the lower end of the casing 1, when it is screwed onto the base, The circular disks 12 and 13 are made of the same size, and are adapted to leave just about the thickness of the flexible member 14 between the outer edge of the disk 13 and the wall of casing 1, when the follower is in withdrawn position. When the follower has moved to the limit of its travel, owing to the tapered bore, this clearance between the disks and wall will be increased, as shown in Fig. 2. The flexible member 14, may be made of leather or any other suitable composition, and is preferably pressed into the cup shape shown from a flat leather disk. This leaves the depending portion 14ª, of this member, with the fibers distorted, and a tendency to spring outward to its original shape, causing the depending portion to normally bear against the wall of the casing. When the follower is pressing against semi-fluid contents of the cup, there is a resulting outward upward pressure against this depending portion of the flexible member 14, tending to keep it pressed against the casing wall, and this tendency is aided by the distorted form of the member, and also aided by the tapered bore of the casing wall, since upward pressure tends to force the depending portion outward, and causes it to cling to the tapered wall more than if the bore were cylindrical.

The spring 15 is made as shown in Fig. 4, comprising a conical lower portion, and then several uniform rounds. The travel of the follower is not so great as the length of the conical portion of the spring, and therefore the spring is never extended to its full capacity, and owing to the particular form used, the conical portion, when fully compressed, as shown in Fig. 1, lies partly inside of the full-sized bends and has a tension component thereon. By this construction the large bends of the spring act as a reserve force when the spring is extended to the limit shown in Fig. 2, and as a cushion, when it is compressed, as in Fig. 1, and keep a nearly constant pressure at any position of the follower. The flexible member 14 tends to fold back upon itself, as shown in Fig. 2, and so constantly to grip the wall of the casing, and to exert a slightly decreasing friction thereon, as the follower travels through the cup. When the bore of the casing is properly tapered, and the size of the disks 12 and 13, and the thickness of member 14, are properly determined, in connection with the strength of spring 15, the follower will be driven with uniform pressure throughout its entire travel, resulting in a constant feeding of grease to the bearing.

The flange 16 has enough resiliency to permit the travel downward thereagainst of the casing 1, until the flange is slightly distorted. However, it has sufficient resistance to prevent travel of the cup to the point of permanent distortion, and consequently it acts as a friction device, holding the cup and base connected together in such manner as not to be loosened by the vibration incident to machinery with which the cup may be used. It is found that this particular form of locking device is very efficient with such metals as cast iron, steel, zinc alloy, brass, aluminum, etc.

By making the interior tapered bore 5 as shown and described above, the grease is allowed to escape with the least possible frictional resistance, with the least possible loss of space due to provision of such a taper. This feature is important in a grease cup which is designed to be used for a very slow feed, and to require no attention of an operator for periods of several weeks, in certain cases.

In operation, the casing 1 is unscrewed from the base, the plunger 9 withdrawn and locked by means of a pin through the hole 16, the cup is filled with grease, the base 7 screwed tightly into position, and the cup then attached to the part to be lubricated. When the pin is withdrawn from locking holes 16, the follower presses upon the contents of the cup, and drives the grease under constant pressure into the bearing to be lubricated. When the cup is emptied it is removed and refilled as in the first instance. The close fit of stem 9 in its guide bore prevents dust or dirt from getting behind the follower inside the cup.

I claim:—

1. An automatic grease cup comprising a casing with a tapered central bore, a follower in said bore, a spring adapted to drive the follower, and a flexible member included in the follower having a forwardly extending portion bearing against the wall of the casing.

2. In an automatic grease cup, the combination of a taper-bored casing, a perforated base therefor, a stem passing through the top of the casing and carrying a follower adapted to travel in the bore of said casing, said follower comprising two rigid disks with a flexible member clamped therebetween and extending ahead of said disks, and a spring to drive the follower through the casing.

3. In an automatic grease cup, the combination of a taper-bored casing, a follower comprising a flexible cup-shaped member, the edges of which bear against the casing wall, and a spring adapted to drive the follower through the casing.

4. In an automatic grease cup comprising a taper-bored casing, a follower composed of two rigid disks riveted on a guide stem and a flexible member clamped between said disks and having a forwardly extending skirt adapted to close the space between said disks and the casing wall.

5. In an automatic grease cup comprising a casing having a central tapered bore and a guiding opening through the top of the casing, a stem passing through said guiding portion, a follower carried by said stem comprising two rigid disks and a flexible cup-shaped member clamped therebetween with a forwardly extending wall adapted to close the space between the disks and the casing, and a spring adapted to drive the follower through the casing.

6. A grease cup comprising a casing and a threaded base therefor, a portion of said base forming a resilient annular flange limiting the travel of the casing thereon.

7. A grease cup comprising a casing and a base adapted to make threaded engagement with the casing, a portion of said base forming a thin flange adapted to form an abutment for the casing when threaded thereupon and to resiliently limit the travel of the casing.

8. In an automatic grease cup comprising a casing, a base closure therefor, a follower adapted to travel in the casing, and a coiled spring behind the follower composed of a conical section and a larger spiral section of uniform diameter.

9. In an automatic grease cup comprising a casing and a follower therein, a spring behind the follower consisting of a spiral portion of uniform diameter, and a conical portion of decreasing diameter, said conical portion being adapted upon compression to seat inside the larger spiral portion of said spring.

10. In an automatic grease cup the combination of a casing having a central tapered bore, a base adapted to engage the casing and to be threaded into the part to be lubricated, an aperture through the base, a stem slidably mounted in the casing and carrying a follower, said follower comprising two rigid disks fixed upon the follower, a flexible cup-shaped member clamped between the disks and having its walls in contact with the wall of the casing, and a spring bearing upon the follower and upon the top of the casing, said spring being composed of a spiral of uniform diameter and a conical portion of decreasing diameter adapted to seat within the larger spiral portion upon withdrawal of the follower.

In testimony whereof, I have hereunto set my hand.

JAMES F. CRAVEN.

Witnesses:
GLENN H. LERESCHE,
A. E. JOHNSON.